United States Patent [19]

Linn

[11] 4,209,963
[45] Jul. 1, 1980

[54] SELF-PROPELLED SWATHER

[76] Inventor: Orville Linn, Box 188,, Lang, Saskatchewan, Canada

[21] Appl. No.: 5,601

[22] Filed: Jan. 22, 1979

Related U.S. Application Data

[63] Continuation-in-part of Ser. No. 830,693, Sep. 6, 1977, abandoned.

[30] Foreign Application Priority Data

Sep. 10, 1976 [CA] Canada .................................. 260985

[51] Int. Cl.² ...................... A01D 41/02; A01D 57/00
[52] U.S. Cl. .......................................... 56/10.8; 56/228
[58] Field of Search ................ 56/228, 10.8, 14.3–14.6

[56] References Cited

U.S. PATENT DOCUMENTS

| | | | |
|---|---|---|---|
| 3,245,695 | 4/1966 | Bernard | 56/228 X |
| 3,483,680 | 12/1969 | Noack | 56/10.8 |
| 3,751,891 | 8/1973 | Molzahn et al. | 56/228 |

Primary Examiner—Russell R. Kinsey
Attorney, Agent, or Firm—Stanley G. Ade

[57] ABSTRACT

A self-propelled swather includes a front drive wheel at one end thereof and a rear drive wheel at the other end with a castoring support wheel on the rear side between the two drive wheels. The drive wheels are each driven by a variable speed hydraulic motor so that side draft or drag of one end is eliminated. Steering from a cab at one end of the swather is by hydrostatic means and the rear drive wheel assembly can be turned 90° for transport. When in the transport position, all of the power can be directed to the front drive wheel thus increasing the drive speed of the swather under these conditions.

25 Claims, 9 Drawing Figures

FIG. 8

SELF-PROPELLED SWATHER

BACKGROUND OF THE INVENTION

This invention relates to new and useful improvements in swathers, particularly self-propelled swathers and is a continuation-in-part of U.S. Ser. No. 830,693 filed on Sept. 6, 1977, and now abandoned.

Conventionally, swathers are either self-propelled under which circumstances they are push-type swathers which are inconvenient to operate and difficult to transport apart from being of a relatively complicated construction.

The other type of swather is a pull-type swather which includes a transversely extending frame with a swather unit mounted thereon and which is pulled by a tractor, from one end of the swather.

The main disadvantage of this type of swather is the fact that the outer end of the swather drags back sometimes as much as five feet which makes it difficult to manoeuver with the tractor and often involves complicated structure in an attempt to eliminate the drag back or side draft of the outer end.

Also considerable strain is placed upon the structure under these circumstances, particularly in relatively wide swathers which can exceed 24 feet.

SUMMARY OF THE INVENTION

The present invention overcomes these disadvantages by providing a self-propelled swather having the advantages of a pull-type swather without the disadvantages of side draft or dragging back of the outboard end.

This is accomplished by providing a main frame with the swather unit mounted therein and having a front drive wheel assembly at one end thereof together with a rear drive wheel assembly adjacent the end of the main frame and a castoring wheel on the main frame situated between the front and rear drive wheel assemblies.

These drive wheel assemblies are preferably driven by independent variable speed hydraulic motors so that side draft or rear dragging of the free end is eliminated. This construction enables a cab to be mounted at one end of the swather above the main frame thus giving excellent vision for operation of the swather and enabling sharp and accurate turns to be made. The steering wheel within the cab is operatively connected to the front drive wheel assembly which is steered by a hydrostatic steering motor and the rear drive wheel assembly includes means to move same through approximately 90° so that the swather can be placed in transport position.

The cab may also be moved through approximately 90° for ease of operation when in the transport position.

The principal object and essence of the invention is therefore to provide a device of the character herewithin described which includes individual hydraulic drive motors for each of the two drive wheels so that the rear drag or side draft can be eliminated.

Another object of the invention is to provide a device of the character herewithin described which combines the advantages of a pull-type swather with a self-propelled swather unit.

Still another object of the invention is to provide a device of the character herewithin described which is easily moved from the swathing position to the transport position and vice-versa.

Still another object of the invention is to provide a device of the character herewithin described which gives a quieter and lighter smooth ride, is extremely simple in construction and is otherwise well suited to the purpose for which it is designed.

With the foregoing in view, and other advantages as will become apparent to those skilled in the art to which this invention relates as this specification proceeds, my invention consists essentially in the arrangement and construction of parts all as hereinafter more particularly described, reference being had to the accompanying drawings in which:

DESCRIPTION OF THE DRAWINGS

In the drawings like characters of reference indicate corresponding parts in the different figures.

DETAILED DESCRIPTION

Proceeding therefore to describe the invention in detail, reference character 10 illustrates a transverse main frame, reference character 11 a swather unit, and reference character 12 a cab situated upon the main frame.

The main frame consists of a transversely extending main beam 13 having a forwardly extending support means in the form of a beam 14, secured to and extending forwardly from one end 15 of the main beam 13 and substantially at right angles thereto.

Figures 1, 4:
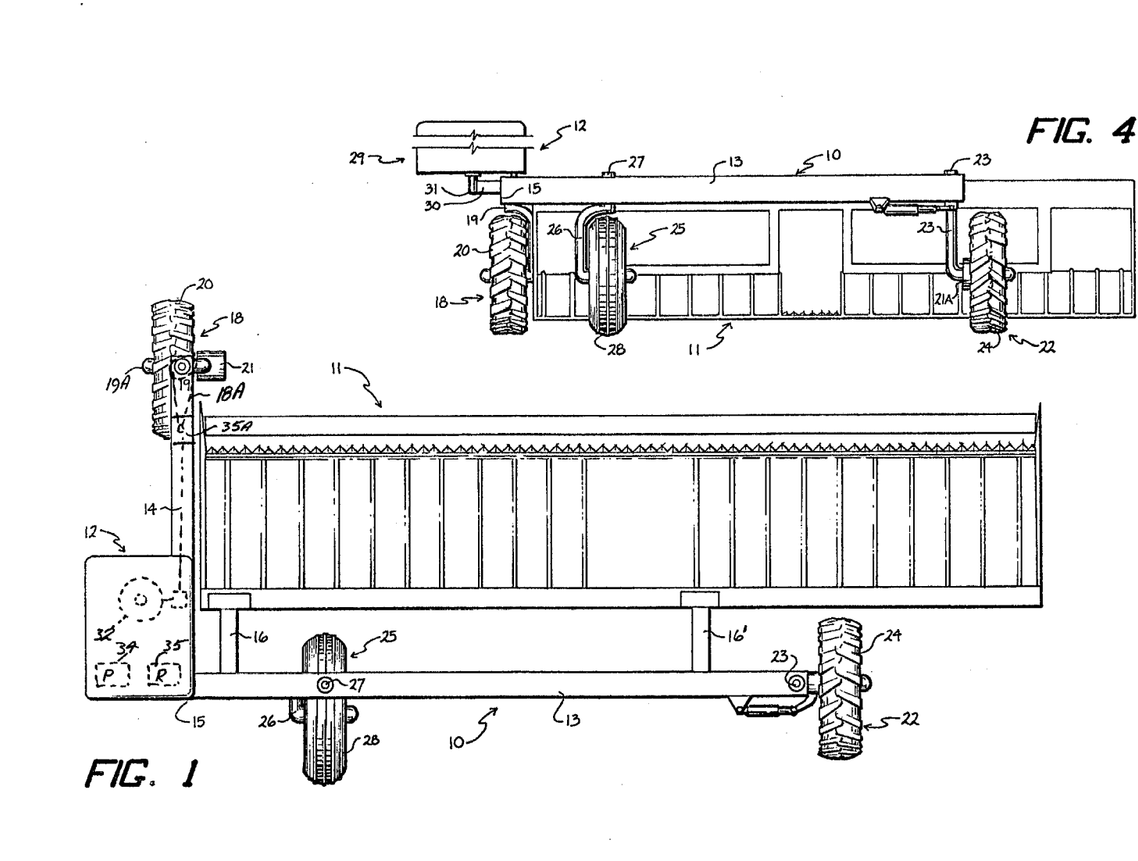
FIG. 1 is a top plan partially schematic view of the invention.
FIG. 4 is a rear view of FIG. 1.
Figures 2, 6, 7:
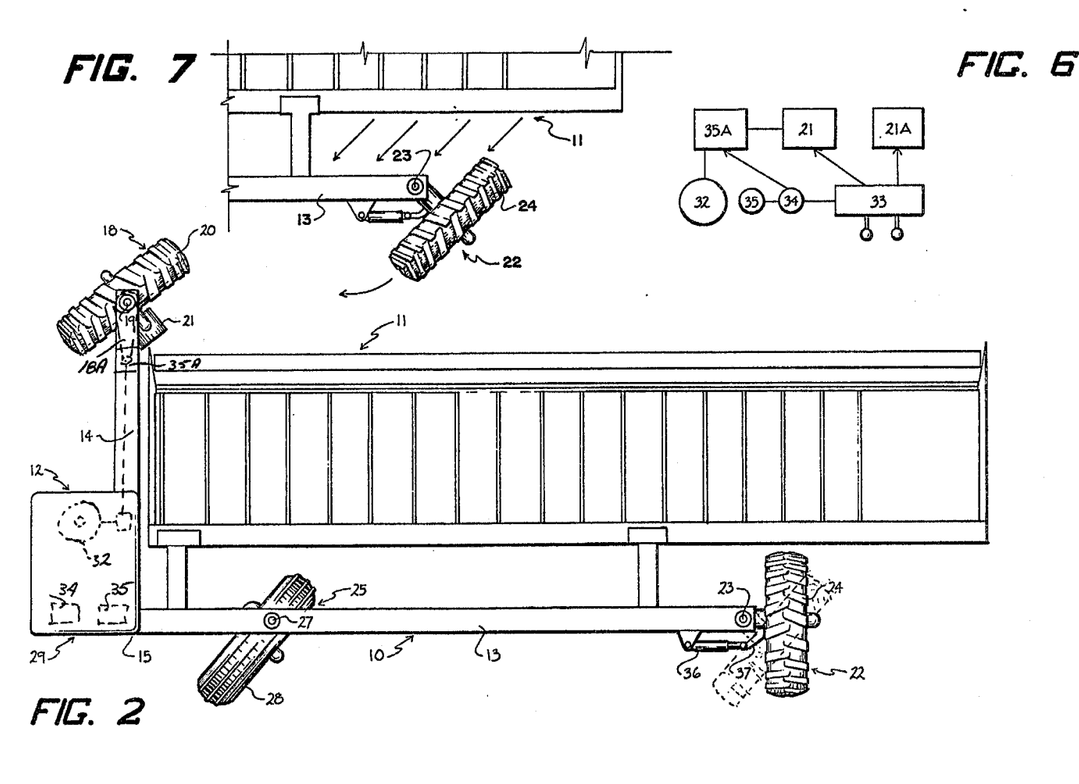
FIG. 2 is a top plan view of FIG. 1 showing the swather in a cornering situation.
FIG. 6 is a schematic view showing one embodiment of the control system.
FIG. 7 is a schematic view showing wheel adjustment position.
Figures 3, 5:
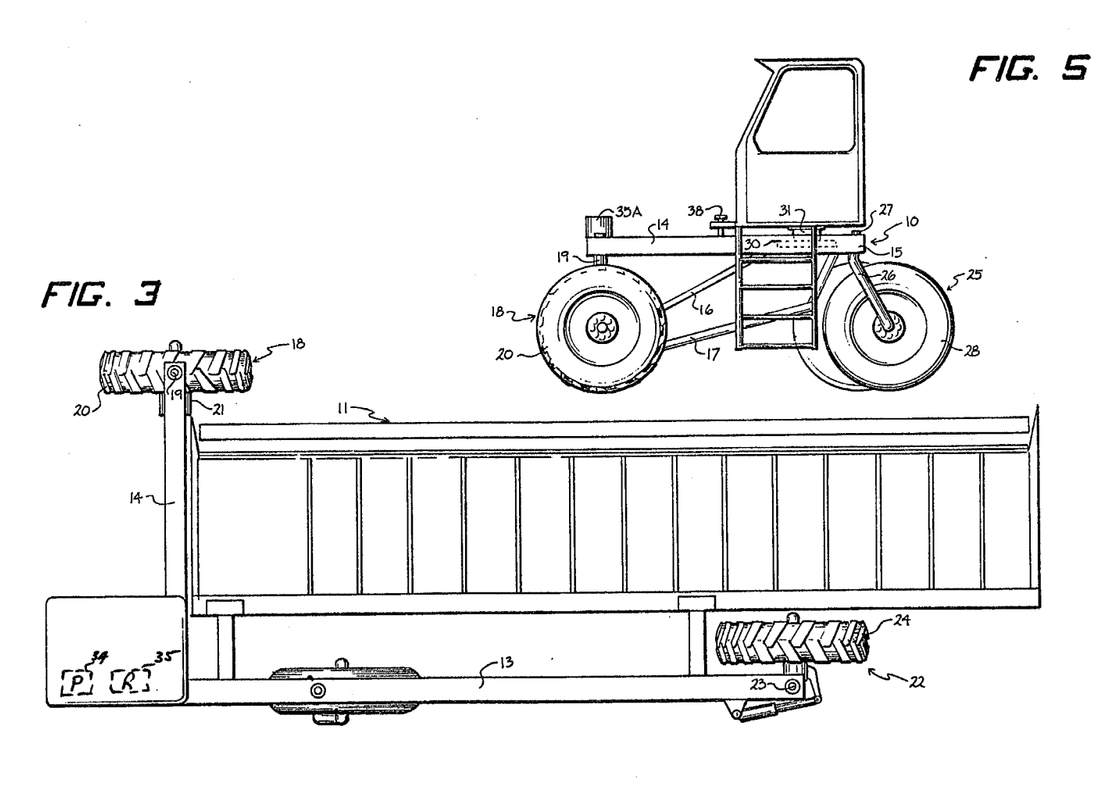
FIG. 3 is a view similar to FIG. 2, but showing the swather in the transport position.
FIG. 5 is a left-hand end view of FIG. 4.

The swather unit 11 is conventional in construction and may either be of a center delivery type as illustrated in FIG. 1, a right delivery type as illustrated in FIG. 2 or a left delivery type as illustrated in FIG. 3. However, as this construction is conventional, it is not believed necessary to discuss same further.

This swather unit 11 is mounted within the main frame 10 by means of members 16 and 16' which extend from the main beam 13. Means may or may not be provided to adjust the height of the swather unit within the main frame, but once again as this is conventional, it is not believed necessary to describe same.

A front wheel drive assembly collectively designated 18, is mounted adjacent the front end of the forwardly extending beam 14 by means of a vertical post 10 pivotally supported within the front end of the beam 14 and including a wheel fork 19A.

A wheel 20 is journalled for rotation within the wheel fork 19A.

An hydraulic motor, preferably of the reversible hydrostatic type is shown schematically by reference character 21, is supported upon the wheel fork 19A and is operatively connected to the front wheel 20 by conventional means such as gears or sprocket and chain (not illustrated) and is adapted to rotate same at varying speeds and in either direction as will hereinafter be described.

A rear drive wheel assembly collectively designated 22, is mounted adjacent the outer or distal end of the main beam 13 and it consists of a vertical post 23 pivoted or journalled for rotation within the main beam 13 and includes a wheel 24 journalled for rotation upon the lower horizontal end of the member 23, in the usual manner.

A further hydraulic motor 21A, oreferably of the reversible hydrostatic type is secured to the post 23 and is operatively connected to this rear wheel 24 to rotate same in either direction and at variable speeds. Once again connection is by gears or sprocket and chain (not illustrated) and is conventional.

A castor wheel assembly collectively designated 25, is mounted to the main beam 13 in a location between the wheel assembly 18 and the wheel assembly 22. This castoring wheel assembly 25 includes the support member 26 journalled for rotation within the main beam as indicated by reference character 27 and carries the castoring wheel 28 journalled for rotation upon the lower horizontal end of the member 26 in the usual manner and this wheel is slightly behind the main beam 13 as clearly shown in the drawings.

These three wheel assemblies 18, 22 and 25 give a three-point support for the swather as clearly shown.

A cab unit collectively designated 29 is mounted upon the main frame adjacent the junction of the main beam 13 and the forwardly extending beam 14 and FIG. 4 shows a bracket assembly 30 extending outwardly from this junction point so that the cab unit 29 can be mounted within the bracket 30 by means of a pivot pin 31.

This means that the cab can be moved manually from a straight-ahead swathing position shown in FIGS. 1 and 2, to a transport position shown in FIG. 3 which is substantially at 90° from the swathing position shown in FIGS. 1 and 2.

It will also be noted that this cab unit is situated elevated above the main frame 10 so that an adequate view is obtained by the operator, not only of the crop being swathed but of any obstructions which may interfere with the operation of the machine.

Situated within the cab is a steering wheel 32 and also shown schematically by reference character 32 in FIG. 6, and a valve control indicated by reference character 33 in FIG. 6.

The valve control controls the fluid from a pump 34 fed by a reservoir 35 (also in the cab). Conventional conduits shown schematically in FIG. 6, extend between the valve control and the hydraulic motors 21 and 21A thus enabling the operator to select firstly the forward or reverse rotation of wheels 20 and 24 and secondly, the relative speeds thereof so that if, for example, the swather is in the straight-ahead swathing position, the speeds of wheels 20 and 24 may be adjusted readily so that there is no drag back or side draft of the outer end of the swather assembly.

The pump also supplies fluid to the steering motor 35A shown schematically in the drawings and taking the form of a hydrostatic motor operatively connected to the vertical spindle 19 in order to steer the front wheel assembly 18. Sprocket and chain assembly 18A is shown in phantom in FIG. 1.

A valve (not illustrated) may be connected to the hydrostatic motor 35A and to the steering wheel 32 so that steering is readily effected. However, such structure is well known so that it is not believed necessary to show details thereof.

When it is desired to corner the swather, the front wheel 20 is steered as necessary so that, for example, the front wheel takes up the position shown in FIG. 2. The castor wheel assembly 25 also automatically tracks as illustrated in FIG. 2 with the rear wheel assembly not turning under these conditions. However, if a sharp turn is necessary, the speed of the rear wheel 24 may be decreased or even reversed and the speed of the front wheel 20 may be increased.

It will therefore be seen that the swather is extremely manoeuverable under all conditions.

When it is desired to transport the swather, it is moved to the transport position shown in FIG. 3. Under these circumstances, the rear drive wheel assembly 22 is moved through approximately 90° so that it is substantially parallel with the main beam 13 and in this connection, a fluid operator 36 which may take the form of an hydraulic piston and cylinder assembly, is provided extending between the main beam 13 and an offstanding member 37 secured to the rear wheel assembly 22. When in this position shown in FIG. 2, the wheel is fixed in the straight-ahead position but when the fluid operator is extended as shown in FIG. 3, the wheel swings through approximately 90° as shown. A positive lock (not illustrated) may be provided for these two positions which may take the form of a pin engaging within apertures in the wheel assembly and the main beam.

When in the transport position, the front wheel assembly is turned by the steering wheel to the position shown in FIG. 3 and of course the castoring wheel automatically tracks as shown.

The cab may also be moved through approximately 90° to take up the position shown in FIG. 3, by rotating same upon pivot pin 31. This may be done manually or hydraulically (not illustrated) or by any other conventional means and the cab may be locked in either position by means of a pin assembly shown schematically in FIG. 5 and identified by reference character 38.

This enables the operator to have good vision for transport of the swather, particularly along public roads and the like.

When in the transport position, the valve control 33 is preferably provided with means whereby all of the power may be directed to the front wheel assembly hydraulic motor 21 from the rear wheel assembly hydraulic motor 21A. This gives approximately twice the power to the front wheel and enables the swather to be driven in transport position, at a speed greater than when in the straight-ahead swathing position.

Figure 8:
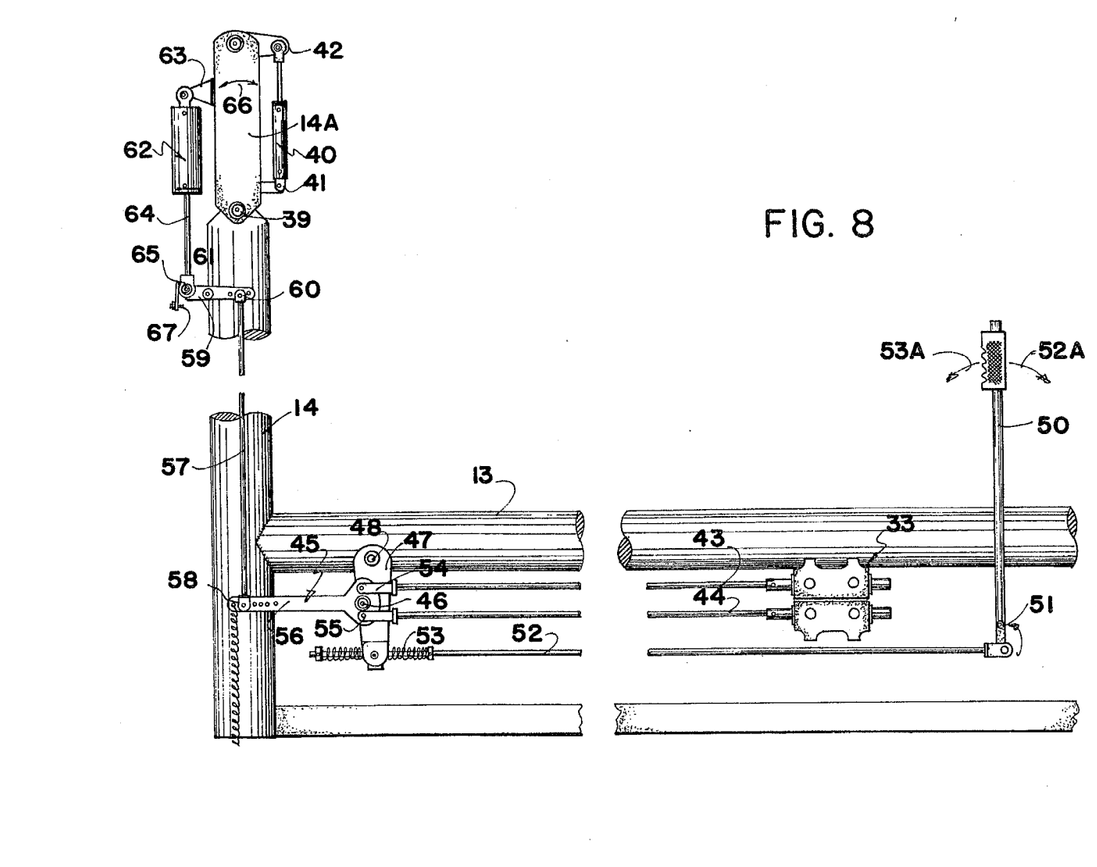
FIG. 8 is a schematic plan view of the steering mechanism and draft control.
Figure 9:
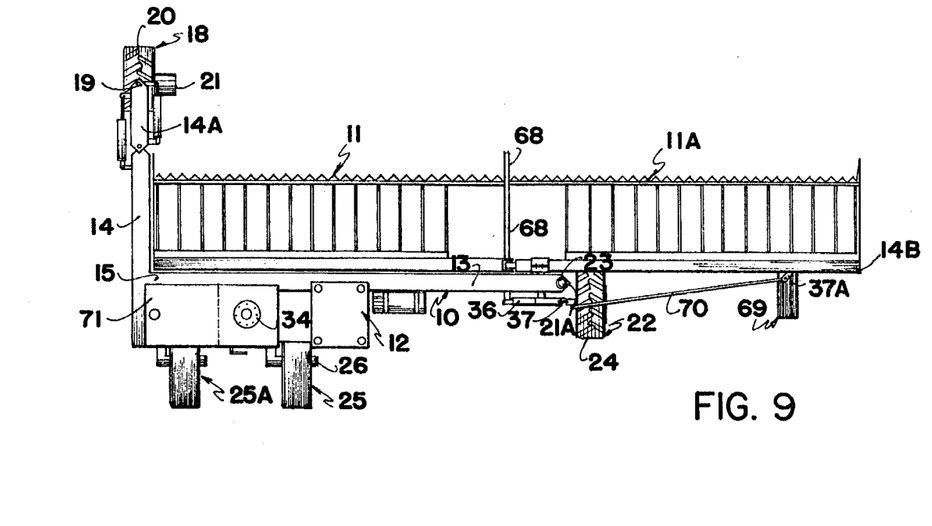
FIG. 9 is a top plan view of the swather showing the swather section in tandem.

In the embodiment illustrated in FIGS. 7, 8 and 9, the front steering and drive wheel assembly 18 is mounted upon a relatively short frame section 14A which in turn is pivoted to the front of the forwardly extending frame member 14, by means of vertically situated pivot pin 39 and a fluid operator collectively designated 40 extends between a lug 41 adjacent the rear end of the portion 14A and an offstanding arm 42 connected to the steering post 19. The fluid operator 40 is connected to the steering wheel in such a manner that rotation of the steering wheel operates an hydraulic valve (not illustrated) which controls hydraulic fluid under pressure to the fluid operator 40 thus turning the front wheel in synchronization with the steering wheel.

FIG. 8 shows a draft control system in which control valve 33 is provided with two sections, one operatively connected to the front left drive wheel for variable oil flow control and the other connected to the rear right wheel for variable oil flow control.

This valve is in the form of a shuttle valve assembly operated by a pair of rods 43 and 44 running substantially parallel with the main frame member 13 and being connected to an actuating plate assembly collectively designated 45 which in turn is pivoted centrally as at 46, to a main control link 47 which in turn is pivoted by one end thereof to the frame member 13 as indicated by reference character 48.

The basic position of this link 47 is controlled by an operating lever 50 within the cab pivoted horizontally adjacent the lower end thereof as at 51 and connected to lever 47 by means of rod 52. This rod 52 which includes a spring loaded mounting assembly 53, is connected to the distal end of the link or lever 47 as clearly shown in FIG. 8.

The control lever 50 is capable of being set in any one of three positions. Neutral as shown in FIG. 8 under which circumstances the shuttle valves 33 are inoperative, forward in which instance the lever 50 is moved in direction of arrow 52, and reverse in which the lever 50 is moved in the direction of arrow 53.

The rods 43 and 44 are pivoted to the member 45 one upon each side of the pivot 46, by means of pivots 54 and 55 and an extension 56 extends centrally of the pivots 54 and 55 and in substantial alignment with pivot 46. A link 57 is pivotally connected by one end thereof to portion 56 of pivot 58 and extends forwardly to be connected to a crank arm 59 by means of pivot 60, the crank arm being pivoted to adjacent the front end of the forward extension 14 of the frame as indicated by reference character 61.

A transport and field position cylinder assembly collectively designated 62 is mounted by one end thereof to lug 63 towards the front end of member 14A with the piston rod 64 being pivotally connected to the other end of the crank link 59 as indicated by reference character 65 and this piston and cylinder assembly 62 normally acts as a fixed or rigid link when the swather is in the field position. When the control lever is in the forward or reversed position, and the swather is in the field position, the rods 43 and 44 route oil from the pump 34 to the hydraulic motors 21 and 21A thus supplying drive to the swather through the wheel assemblies 18 and 22.

Under these circumstances the draft control system is in the position shown in FIG. 8 with the portion 14A being in alignment with the frame member 14.

However, when the steering wheel is turned to the left or right, the piston and cylinder assembly 40 turns the front wheel 18 around the vertical pivot 19. This applies a draft force to the portion 14A and pivots it slightly around its pivot 39 in one direction or the other depending upon the direction of wheel 20, and as indicated by double headed arrow 66. This moves the piston and cylinder assembly 62, which is acting as a rigid link, thus actuating crank link 59 and pivoting lever 45 around its pivot 46 thus moving rod 43 in one direction and rod 44 in the other direction which in turn actuates the shuttle valves 33. As an example, if the swather is turned to the right, then the linkage causes the hydraulic motor 21 to speed up and the hydraulic motor 21A to slow down. If the swather is steered to the left, then the rods 43 and 44 are reversed thus causing the hydraulic motor 21 to slow down and the hydraulic motor 21A to speed up thus facilitating the turning of the swather.

If a severe right turn is made then the lever 45 moves sufficiently to actually reverse the direction of hydraulic motor 21A thus facilitating a right hand turn by backing up the right hand end of the swather.

When the swather is moved to the transport position, piston and cylinder assembly 62 is retracted so that portion 14A extends at right angles to portion 14 under which circumstances an offstanding lug 67 adjacent pivot 65, engages frame member 14 and prevents the draft control from operating as of course there is no necessity to utilize same.

FIG. 9 shows the swather with a right hand extension swather section 11A pivoted to one end of the swather section 11 around pivots 68 which permit the two sections to articulate in a vertical plane.

A support wheel assembly 69 is pivotally secured to the frame 14B of the section 11A adjacent the distal end thereof and this wheel is steerable by means of link 70 extending between arm 37 of wheel assembly 22 and a similar arm 37A of wheel assembly 69 so that the steering of the wheel assembly 18 when in the field operating position shown in FIG. 9, also steers not only wheel assembly 22 but also wheel assembly 69.

This wheel assembly 69 can also be moved to the transport position similar to wheel assembly 22.

Due to the width of the tandem swather assembly illustrated in FIG. 9, a further castor wheel assembly 25A may be provided adjacent the inner end of the frame 13. Also in this particular structure, the cab 12 is mounted inboard of the forwardly extending beam 14 with the engine assembly 71 being mounted upon the frame between the cab and the forwardly extending member 14.

In conclusion, there are two basic positions which the two drive wheels 20 and 24 of the swather can assume. One is a longitudinal position which is for transport. In this position, the front wheel functions as the steering wheel and the rear wheel is fixed in the longitudinal position and trails therebehind.

The other position is the field operating position illustrated in FIG. 8. In this position, the front left wheel 20 serves as the main steering wheel. The sharper the turn, the more the draft control mechanism is activated. In order to make a sharp right turn, the draft control mechanism is designed to reverse the rotation of the right rear wheel 24 and turn that wheel approximately 40° to the right as illustrated in FIG. 7, thus drawing the right end of the table back while, at the same time, moving the whole table to the left. These movements improve the position of the swather for forward movement after the turn. Essentially the same basic procedures apply to a sharp left turn as well as right turns. The sharp right turn movement is shown in phantom in FIG. 7.

Since various modifications can be made in my invention as hereinabove described, and many apparently widely different embodiments of same made within the spirit and scope of the claims without departing from such spirit and scope, it is intended that all matter contained in the accompanying specification shall be interpreted as illustrative only and not in a limiting sense.

What I claim as my invention is:

1. A self-propelled swather comprising in combination a transverse main frame, a swather unit operatively mounted and supported within said main frame, a front drive wheel assembly on one end of said main frame, a rear drive wheel assembly adjacent the other end of said main frame, a castoring support wheel assembly on said main frame situated between said front and rear drive wheel assemblies, as hydraulic motor operatively connected to each of said drive wheel assemblies and means on said swather operatively connected to said front drive wheel assembly to steer said front drive wheel assembly.

2. The swather according to claim 1 which includes further means operatively extending between said frame and said rear drive wheel assembly to turn said rear drive wheel assembly from a straight-ahead swathing position to a transport position substantially 90° from said swathing position and vice-versa.

3. The swather according to claim 2 in which said last mentioned means includes a fluid operator operatively connected between said main frame and said rear drive wheel assembly.

4. The swather according to claim 1 which includes a cab unit mounted on said main frame, said steering means including a steering wheel within said cab unit, hydrostatic motor means mounted adjacent said front drive wheel assembly, means operatively connecting said hydrostatic motor means to said front drive wheel assembly and means operatively connecting said steering wheel with said hydrostatic motor means to steer said front drive wheel assembly.

5. The swather according to claim 2 which includes a cab unit mounted on said main frame, said steering means including a steering wheel within said cab unit, hydrostatic motor means mounted adjacent said front drive wheel assembly, means operatively connecting said hydrostatic motor means to said front drive wheel assembly and means operatively connecting said steering wheel with said hydrostatic motor means to steer said front drive wheel assembly.

6. The swather according to claim 3 which includes a cab unit mounted on said main frame, said steering means including a steering wheel within said cab unit, hydrostatic motor means mounted adjacent said front drive wheel assembly, means operatively connecting said hydrostatic motor means to said front drive assembly and means operatively connecting said steering wheel with said hydrostatic motor means to steer said front drive wheel assembly.

7. The swather according to claim 4 which includes means to pivotally mount said cab unit upon said main frame whereby said cab unit moves from a straight-ahead swathing position to a transport position substantially at 90° from said straight-ahead swathing position, and vice-versa.

8. The swather according to claim 5 which includes means to pivotally mount said cab unit upon said main frame whereby said cab unit moves from a straight-ahead swathing position to a transport position substantially at 90° from said straight-ahead swathing position, and vice-versa.

9. The swather according to claim 6 which includes means to pivotally mount said cab unit upon said main frame whereby said cab unit moves from a straight-ahead swathing position to a transport position substantially at 90° from said straight-ahead swathing position, and vice-versa.

10. The assembly according to claim 1 in which said main frame includes a transversely extending main beam and forwardly extending support means extending from said main beam at said one end of said main frame, said front drive wheel assembly being mounted adjacent the front end of said forwardly extending support means, said rear drive wheel assembly being mounted adjacent the distal end of said main beam.

11. The assembly according to claim 2 in which said main frame includes a transversely extending main beam and forwardly extending support means extending from said main beam at said one end of said main frame, said front drive wheel assembly being mounted adjacent the front end of said forwardly extending support means, said rear drive wheel assembly being mounted adjacent the distal end of said main beam.

12. The assembly according to claim 3 in which said main frame includes a transversely extending main beam and forwardly extending support means extending from said main beam at said one end of said main frame, said front drive wheel assembly being mounted adjacent the front end of said forwardly extending support means, said rear drive wheel assembly being mounted adjacent the distal end of said main beam.

13. The assembly according to claim 4 in which said main frame includes a transversely extending main beam and forwardly extending support means extending from said main beam at said one end of said main frame, said front drive wheel assembly being mounted adjacent the front end of said forwardly extending support means, said rear drive wheel assembly being mounted adjacent the distal end of said main beam.

14. The assembly according to claim 5 in which said main frame includes a transversely extending main beam and forwardly extending support means extending from said main beam at said one end of said main frame, said front drive wheel assembly being mounted adjacent the front end of said forwardly extending support means, said rear drive wheel assembly being mounted adjacent the distal end of said main beam.

15. The assembly according to claim 6 in which said main frame includes a transversely extending main beam and forwardly extending support means extending from said main beam at said one end of said main frame, said front drive wheel assembly being mounted adjacent the front end of said forwardly extending support means, said rear drive wheel assembly being mounted adjacent the distal end of said main beam.

16. The assembly according to claim 7 in which said main frame includes a transversely extending main beam and forwardly extending support means extending from said main beam at said one end of said main frame, said front drive wheel assembly being mounted adjacent the front end of said forwardly extending support means, said rear drive wheel assembly being mounted adjacent the distal end of said main beam.

17. The assembly according to claim 8 in which said main frame includes a transversely extending main beam and forwardly extending support means extending from said main beam at said one end of said main frame, said front drive wheel assembly being mounted adjacent the front end of said forwardly extending support means, said rear drive wheel assembly being mounted adjacent the distal end of said main beam.

18. The assembly according to claim 9 in which said main frame includes a transversely extending main beam and forwardly extending support means extending from said main beam at said one end of said main frame, said front drive wheel assembly being mounted adjacent the front end of said forwardly extending support means, said rear drive wheel assembly being mounted adjacent the distal end of said main beam.

19. The swather according to claim 1 in which said forwardly extending support means includes a support member for said front drive wheel assembly, said support member being pivotally mounted on the forward end of said forwardly extending support means, a draft control assembly mounted on said main frame and being operatively connected between said rear drive wheel assembly and said front drive wheel assembly, and a fluid operator operatively connected between said support member and said forwardly extending support means, said fluid operator moving said support member and hence said front drive wheel assembly from a straight-ahead field working position to a transport position and vice-versa and acting as a rigid link when in said positions whereby when said front drive wheel assembly is turned from the straight-ahead position, said fluid operator operates said draft control to vary the speed relationship between said front drive wheel assembly and said rear drive wheel assembly.

20. The swather according to claim 2 in which said forwardly extending support means includes a support member for said front drive wheel assembly, said support member being pivotally mounted on the forward end of said forwardly extending support means, a draft control assembly mounted on said main frame and being operatively connected between said rear drive wheel assembly and said front drive wheel assembly, and a fluid operator operatively connected between said support member and said forwardly extending support means, said fluid operator moving said support member and hence said front drive wheel assembly from a straight-ahead field working position to a transport position and vice-versa and acting as a rigid link when in said positions whereby when said front drive wheel assembly is turned from the straight-ahead position, said fluid operator operates said draft control to vary the speed relationship between said front drive wheel assembly and said rear drive wheel assembly.

21. The swather according to claim 3 in which said forwardly extending support means includes a support member for said front drive wheel assembly, said support member being pivotally mounted on the forward end of said forwardly extending support means, a draft control assembly mounted on said main frame and being operatively connected between said rear drive wheel assembly and said front drive wheel assembly, and a fluid operator operatively connected between said support member and said forwardly extending support means, said fluid operator moving said support member and hence said front drive wheel assembly from a straight-ahead field working position to a transport position and vice-versa and acting as a rigid link when in said positions whereby when said front drive wheel assembly is turned from the straight-ahead position, said fluid operator operates said draft control to vary the speed relationship between said front drive wheel assembly and said rear drive wheel assembly.

22. The swather according to claim 11 in which said forwardly extending support means includes a support member for said front drive wheel assembly, said support member being pivotally mounted on the forward end of said forwardly extending support means, a draft control assembly mounted on said main frame and being operatively connected between said rear drive wheel assembly and said front drive wheel assembly, and a fluid operator operatively connected between said support member and said forwardly extending support means, said fluid operator moving said support member and hence said front drive wheel assembly from a straight-ahead field working position to a transport position and vice-versa and acting as a rigid link when in said positions whereby when said front drive wheel assembly is turned from the straight-ahead position, said fluid operator operates said draft control to vary the speed relationship between said front drive wheel assembly and said rear drive wheel assembly.

23. The swather according to claim 12 in which said forwardly extending support means includes a support member for said front drive wheel assembly, said support member being pivotally mounted on the forward end of said forwardly extending support means, a draft control assembly mounted on said main frame and being operatively connected between said rear drive wheel assembly and said front drive wheel assembly, and a fluid operator operatively connected between said support member and said forwardly extending support means, said fluid operator moving said support member and hence said front drive wheel assembly from a straight-ahead field working position to a transport position and vice-versa and acting as a rigid link when in said positions whereby when said front drive wheel assembly is turned from the straight-ahead position, said fluid operator operates said draft control to vary the speed relationship between said front drive wheel assembly and said rear drive wheel assembly.

24. The swather according to claims 19, 20 or 21 in which said draft control assembly includes a dual shuttle control valve on said main frame, a main control link pivoted by one end thereof to said main frame, an actuating plate assembly pivoted by one end thereof to said main control link adjacent the other end thereof and extending substantially at right angles therefrom, a pair of rods operatively connected by one end thereof to said shuttle control valve and by the other end thereof to said actuating plate assembly, one upon each side of the pivot of said actuating plate assembly, and linkage means operatively extending between the other end of said main control link and said fluid actuator, said control valve assembly being operatively connected to said hydraulic motor of said front and rear drive wheel assemblies.

25. The swather according to claims 22 or 23 in which said draft control assembly includes a dual shuttle control valve on said main frame, a main control link pivoted by one end thereof to said main frame, an actuating plate assembly pivoted by one end thereof to said main control link adjacent the other end thereof and extending substantially at right angles therefrom, a pair of rods operatively connected by one end thereof to said shuttle control valve and by the other end thereof to said actuating plate assembly, one upon each side of the pivot of said actuating plate assembly, and linkage means operatively extending between the other end of said main control link and said fluid actuator, said control valve assembly being operatively connected to said hydraulic motor of said front and rear drive wheel assemblies.

* * * * *